US011601716B2

(12) United States Patent
Ravindranath et al.

(10) Patent No.: US 11,601,716 B2
(45) Date of Patent: Mar. 7, 2023

(54) SMART NOTIFICATION FOR OVER-THE-TOP (OTT) STREAMING AMONG MULTIPLE DEVICES

(71) Applicant: ARRIS Enterprises LLC, Suwanee, GA (US)

(72) Inventors: Nithin Raj Kuyyar Ravindranath, Bangalore (IN); Sandeep Guddeokoppa Suresh, Bangalore (IN); Vinod Jatti, Bangalore (IN); Kiran Tovinkere Srinivasan, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/191,319

(22) Filed: Mar. 3, 2021

(65) Prior Publication Data
US 2021/0281915 A1 Sep. 9, 2021

Related U.S. Application Data

(60) Provisional application No. 62/984,635, filed on Mar. 3, 2020.

(51) Int. Cl.
*H04N 21/442* (2011.01)
*H04N 21/45* (2011.01)
*H04N 21/472* (2011.01)

(52) U.S. Cl.
CPC ... *H04N 21/44227* (2013.01); *H04N 21/4516* (2013.01); *H04N 21/47211* (2013.01)

(58) Field of Classification Search
CPC ......... H04N 21/44227; H04N 21/4516; H04N 21/47211; H04N 21/25816;
(Continued)

(56) References Cited

U.S. PATENT DOCUMENTS 8,984,285 B1 * 3/2015 Dorwin ................. H04L 9/0631
713/151
9,467,726 B1 * 10/2016 Le-Chau .......... H04N 21/26225
(Continued)

FOREIGN PATENT DOCUMENTS

EP 711084 A2 * 5/1996 ........... G11B 15/125

OTHER PUBLICATIONS

Dorwin et al., Encrypted Media Extensions W3C Recommendation Sep. 18, 2017 (Year: 2017).*
(Continued)

*Primary Examiner* — Robert J Hance
(74) *Attorney, Agent, or Firm* — Chernoff, Vilhauer, McClung & Stenzel, LLP

(57) ABSTRACT

A system and method for notifying client devices in a subscriber account that the account is undersubscribed and no further client devices can stream media content until other client devices are no longer actively streaming media content is disclosed herein. The method comprises receiving a request to receive and play the media content from a requesting client device, the requesting client device being one of a plurality of client devices enabled to receive media content according to a subscriber account and determining if the subscriber account is undersubscribed; if the subscriber account is not undersubscribed. If the subscriber account is not undersubscribed, initiating transmission of the media content, and if the subscriber account is undersubscribed, information is transmitted to the requesting client device, the information including data indicating the subscriber account is undersubscribed without initiating the transmission of the media content.

19 Claims, 7 Drawing Sheets

(58) Field of Classification Search
CPC ......... H04N 21/25875; H04N 21/4782; H04N 21/654; H04N 21/2396
See application file for complete search history.

(56) References Cited

U.S. PATENT DOCUMENTS

| | | | |
|---|---|---|---|
| 2004/0168061 A1* | 8/2004 | Kostal | H04L 63/06 713/170 |
| 2010/0064307 A1* | 3/2010 | Malhotra | H04N 21/63775 725/86 |
| 2012/0008786 A1* | 1/2012 | Cronk | G06F 21/10 726/28 |
| 2013/0174233 A1 | 7/2013 | Dykeman et al. | |
| 2015/0230004 A1 | 8/2015 | Vanduyn et al. | |
| 2015/0324379 A1* | 11/2015 | Danovitz | H04N 21/2743 707/825 |
| 2016/0364551 A1 | 12/2016 | Bouazizi et al. | |
| 2017/0006314 A1* | 1/2017 | Danovitz | G06F 16/152 |
| 2019/0149863 A1* | 5/2019 | Lewis | H04L 67/535 706/12 |

OTHER PUBLICATIONS

International Search Report and Written Opinion Re: Application No. PCT/US/2021/020703, dated May 28, 2021.

\* cited by examiner

```
<CustomData>
 <ActiveClientDevices>
  <DeviceDetails>
   <DeviceID MAC-Address="11:22:33:44:55:66" FriendlyName="John-iPad">
   <DeviceLocation> Staybridge suites, Mira Mesa Blvd, San Diego, CA </DeviceLocation>
   <OTT_ContentName> Jurassic Park 3 <OTT_ContentName>
   Duration StartTime="12:30pm Oct 2019" ExpectedEndTime="12:30pm Oct 2019">
   <priority value="high">
  </DeviceDetails>
  <DeviceDetails>
   <DeviceID MAC-Address="AA:BB:CC:DD:11:22" FriendlyName="Kidsroom-iPad">
   <DeviceLocation> Xyz, Abcd Blvd, San Diego, CA </DeviceLocation>
   <OTT_ContentName> Tom and Jerry cartoon Show <OTT_ContentName>
   Duration StartTime="1:00pm Oct 2019" ExpectedEndTime="1:30pm Oct 2019">
   <priority value="low">
  </DeviceDetails>
 </ActiveClientDevices>
</CustomData>
```

*FIG. 6*

SMART NOTIFICATION FOR OVER-THE-TOP (OTT) STREAMING AMONG MULTIPLE DEVICES

CROSS-REFERENCE TO RELATED APPLICATIONS

This application claims benefit of U.S. Provisional Patent Application No. 62/984,635, entitled "SMART NOTIFICATION FOR OVER-THE-TOP (OTT) STREAMING AMONG MULTIPLE DEVICES," by Vinod S. Jatti, Kiran Tovinkere Srinivasan, Sandeep Guddeokoppa Suresh, and Nithin Raj Kuyyar Ravindanath, filed Mar. 3, 2020, which application is hereby incorporated by reference herein.

BACKGROUND

1. Field

The present disclosure relates to systems and methods for transmitting media programs and other data to remote clients, and in particular to a system and method for informing such remote clients when subscription limits have been exceeded.

2. Description of the Related Art

The delivery of media programs and other data to customers has evolved from broadcast via terrestrial transmission to include cable and satellite transmission. Such media content is created by content providers (who create the content itself), such as ESPN and DISNEY, and service providers (who provide the content to customers such as subscribers) such as DIRECTV, SPECTRUM, HULU or NETFLIX. In some cases, business entities are both content providers and service providers (for example, HULU also produces content, an FOX, who produces content, is also a broadcast (as opposed to subscription based) service provider.

The advent of the Internet and the availability of high-bandwidth data channels to end-users has made over-the-top (OTT) delivery of such media programs possible and more widespread. OTT content refers to data such as media programs and other content delivered via an Internet connection rather than traditional (terrestrial, satellite, or cable broadcast means. Such OTT content can come from an content provider that is exclusively OTT (e.g. Sling TV or NETFLIX), from a traditional service provider such as DIRECTV, typically as an adjunct to their broadcast services.

OTT streaming services typically provide different plans to meet different customer needs at different cost points. Typically, such plans enforce a limit on the number of different devices a subscriber may stream OTT content to at the same time. For example, NETFLIX has (a) a basic plan that allows streaming of standard definition (SD) media content from NETFLIX on only one device at a time and in standard definition (SD), (b) a standard plan that allows OTT streaming of high definition (HD) media content from NETFLIX, on as any as two different devices at the same time, and (c) a premium plan which allows streaming of HD media content from NETFLIX on as many as four devices at the same time. Premium plans may permit OTT streaming in ultra-high definition (UHD) were available.

When a customer device requests the streaming media content, the service provider typically determines whether granting the request will exceed the number of devices to which content can be screened at the same time. For example, if the customer is subscribed to the basic plan, and one customer devices is currently streaming media content from the service provider, the service provider will determine that granting the streaming request will exceed the maximum number of devices that can stream content at the same time, and deny the request.

Typically, when such a determination is made, the service provider responds with a playback error instead of streaming the requested media content. The playback error displayed is typically not informative to the customer, as it does not provide any information as to which devices are currently active and playing content. In many cases, the subscriber is not aware that multiple devices are trying to play content using a single customer account that supports only one device at a time.

In view of the foregoing, what is needed is a system and method for notifying clients of the reasons for service (e.g. OTT downloading of content) denial. A solution is described below. The methods and systems described herein satisfy that need.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for notifying client devices in a subscriber account that the account is undersubscribed and no further client devices can stream media content until other client devices are no longer actively streaming media content. This system is useful in over-the-top content distribution systems. In one embodiment, the method comprises receiving a request to receive and play the media content from a requesting client device, the requesting client device being one of a plurality of client devices enabled to receive media content according to a subscriber account and determining if the subscriber account is undersubscribed; if the subscriber account is not undersubscribed. If the subscriber account is not undersubscribed, initiating transmission of the media content, and if the subscriber account is undersubscribed, information is transmitted to the requesting client device, the information including data indicating the subscriber account is undersubscribed without initiating the transmission of the media content. In the embodiments described below, the information transmitted to the requesting client device includes one or more of (a) data identifying current other subscriber account activity causing the undersubscription of the subscriber account without initiating the transmission of the media content, (b) a time the current other subscriber account activity commenced; (c) the media content streamed by the other subscriber account activity; (d) a location of client device performing the current other subscriber account activity; (e) a time at which streaming of the media content implicated by the current other subscriber account activity is predicted to end; (f) a uniform resource locator (URL) of other of the plurality of client devices used for the other subscriber account activity; and (g) a media access control (MAC) address of other of the plurality of client devices used for the other subscriber account activity.

Another embodiment is evidenced by a web server having a processor and a memory communicatively coupled to the processor, the memory storing processor instructions including processor instructions for receiving a request to receive and play the media content from a requesting client device, the requesting client device being one of a plurality of client devices enabled to receive media content according to a subscriber account; determining if the subscriber account is undersubscribed; if the subscriber account is not undersubscribed, initiating transmission of the media content; and if the subscriber account is undersubscribed, transmitting information to the requesting client device, the information including data indicating the subscriber account is undersubscribed without initiating the transmission of the media content.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout:

FIG. 6 is a diagram illustrating an example of custom data in an XML format.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

As described above, in systems where content is streamed via OTT to more than one subscriber device, there is a danger of attempting to stream content to more devices than permitted by the subscriber account. In such cases, the client device typically presents an error message that does not identify the source or cause of the problem, how the problem can be ameliorated, or how long the problem is expected to continue.

Figure 1:
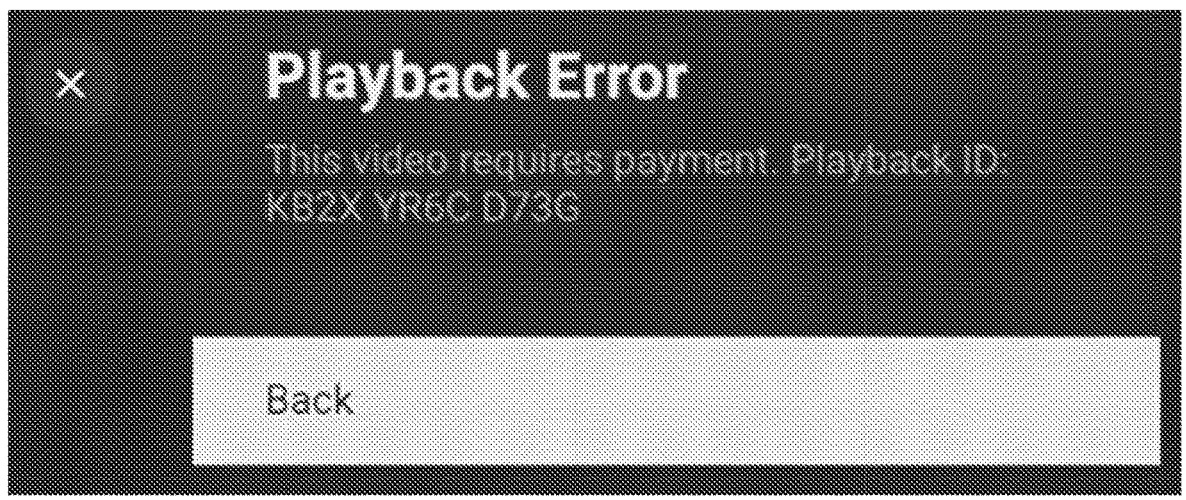
FIG. 1 is a diagram illustrating one embodiment of a prior art error message.

FIG. 1 is a diagram illustrating one embodiment of a prior art error message. The illustrated error message is transmitted from the service provider to the client device. In this case, a bug reporter misunderstood the error and presented a purchase YouTube playback error pop-up after 3 minutes for error licensing. As is illustrated, the error message provides no explanation or reason for the denial of service and is misleading the user into believing payment is required to stream the requested video content. No information is provided to the user to indicate that the reason is that they have reached their limit as to the number of devices that can stream content at the same time.

Two problems result. First, the customer may become confused and contact the service provider's customer service representatives when unnecessary. For example, a customer may have purchased a subscription to YOU TUBE that allows OTT streaming to two customer devices at a time. If a third customer device attempts to stream content from this service provider, the user may be presented with error message. Second, when a customer device attempts to stream media content when the maximum number of devices that can simultaneously stream media content has already been reached, that customer is not provided information by which they can determine which of the other devices supported by the customer account are currently streaming content from the OT I' service provider.

The system and method described below provides the requesting device with information clearly defining why service was denied, and in selected embodiments, information by which the customer may understand the issue and ameliorate the problem. Embodiments are disclosed in which the devices currently streaming OTT content are provided (e.g. the device name, tagged friendly name, family name, MAC address), what media content is being streamed, and when other streaming sessions with other devices are expected to end (e.g. when the content currently being streamed is scheduled to be completed). As a result, the subscriber is aware of the cause of the denial of service and can be made aware of what other devices authorized by the subscriber account are in use. This additional information may be provided pursuant to privacy settings which can be used to disable the feature.

Figure 2:
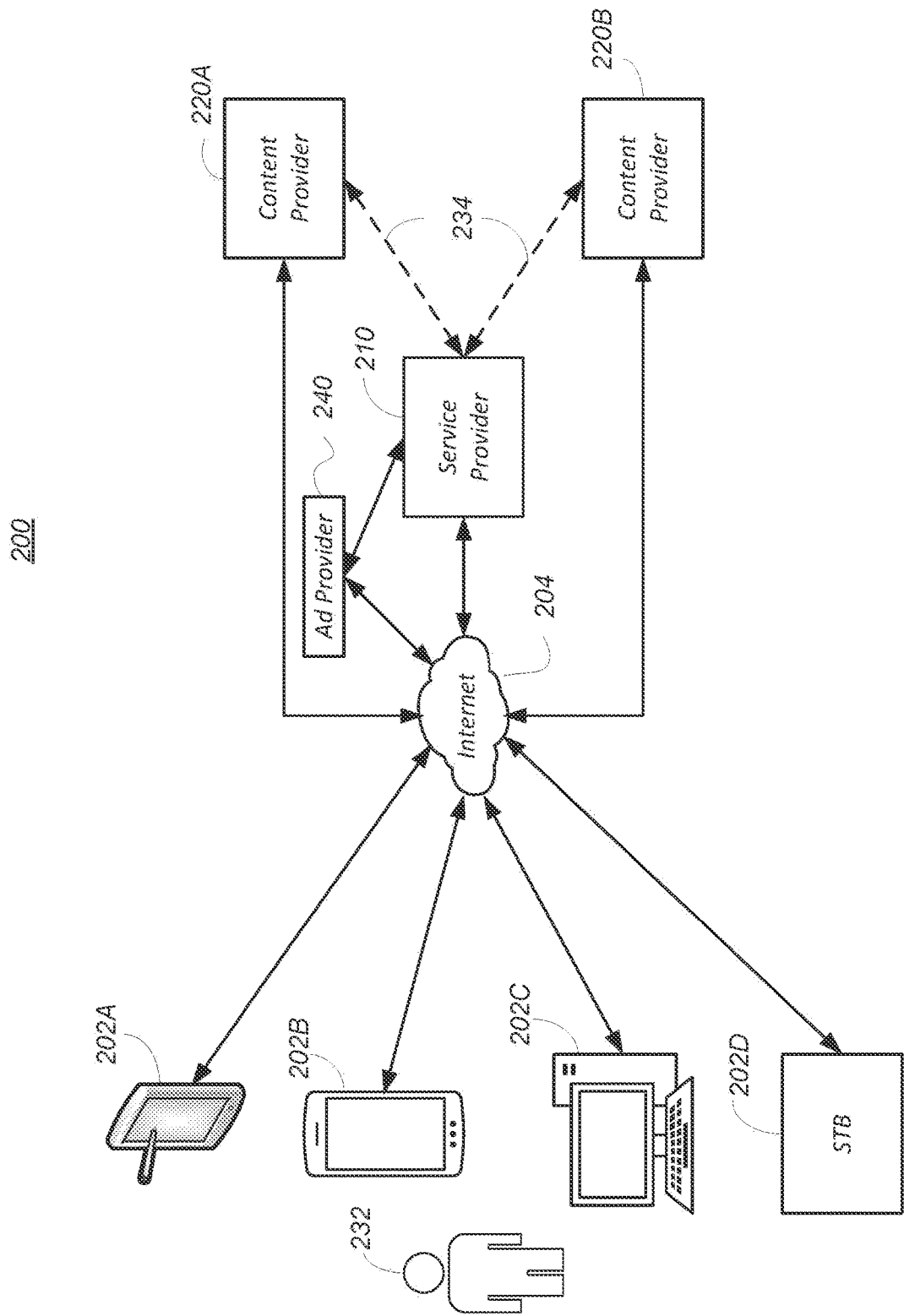
FIG. 2 is a diagram illustrating an exemplary OTT content streaming system.

FIG. 2 is a diagram illustrating an exemplary OTT content streaming system 200. In the illustrated embodiment, the system 200 may comprise one or more content providers 220A, 220B (hereinafter, content provider(s) 220), in communication with a communication network 204 such as the Internet. The OTT content streaming system 200 may also comprises a service provider 210, also in communication with the communication network 204 or another network. The content providers 220 and service provider may include one or more video servers and one or more databases for storing and serving media content. In one embodiment, the service provider 210 is an OTT video-on-demand and/or streaming service provider with access to the media content of the content providers 220.

The OTT content streaming system 200 transmits media programs to a plurality of client devices 202A-202D. Such devices may include a client, a smartphone 202B, a desktop or laptop computer 202C and/or a set top box (STB) 202D (alternatively collectively referred to hereinafter as client device(s) 202). Client devices 202 may both be enabled to receive media content under the same user subscription, and may receive such media content from the service provider 210 or directly from the content providers 220.

In cases where the media content is provided from the service provider 210, the service provider 210 licenses media programs from the content providers 220. In cases where the media programs are streamed to the client device 202 directly from the servers of the content providers 220 such licensing is not required.

Media programs and metadata may be obtained via a communication network 204 such as the Internet, or through auxiliary (and/or dedicated) communication links 234).

Using the client devices 202, remote users 232 can communicate with the service provider(s) 210 or content provider(s) 220 using the communication network 204, to obtain media programs (including video-on-demand and/or streaming video services) and other content.

The OTT content streaming system 200 may also comprise one or more advertisement providers 240, which supply advertisements that are replayed in connection with the media programs provided by the service provider 210 or content providers 220. In the illustrated embodiment, the advertisement provider 240 includes an advertisement provider server communicatively coupled to an associated and communicatively coupled advertisement provider database.

OTT Streaming

Figure 3:
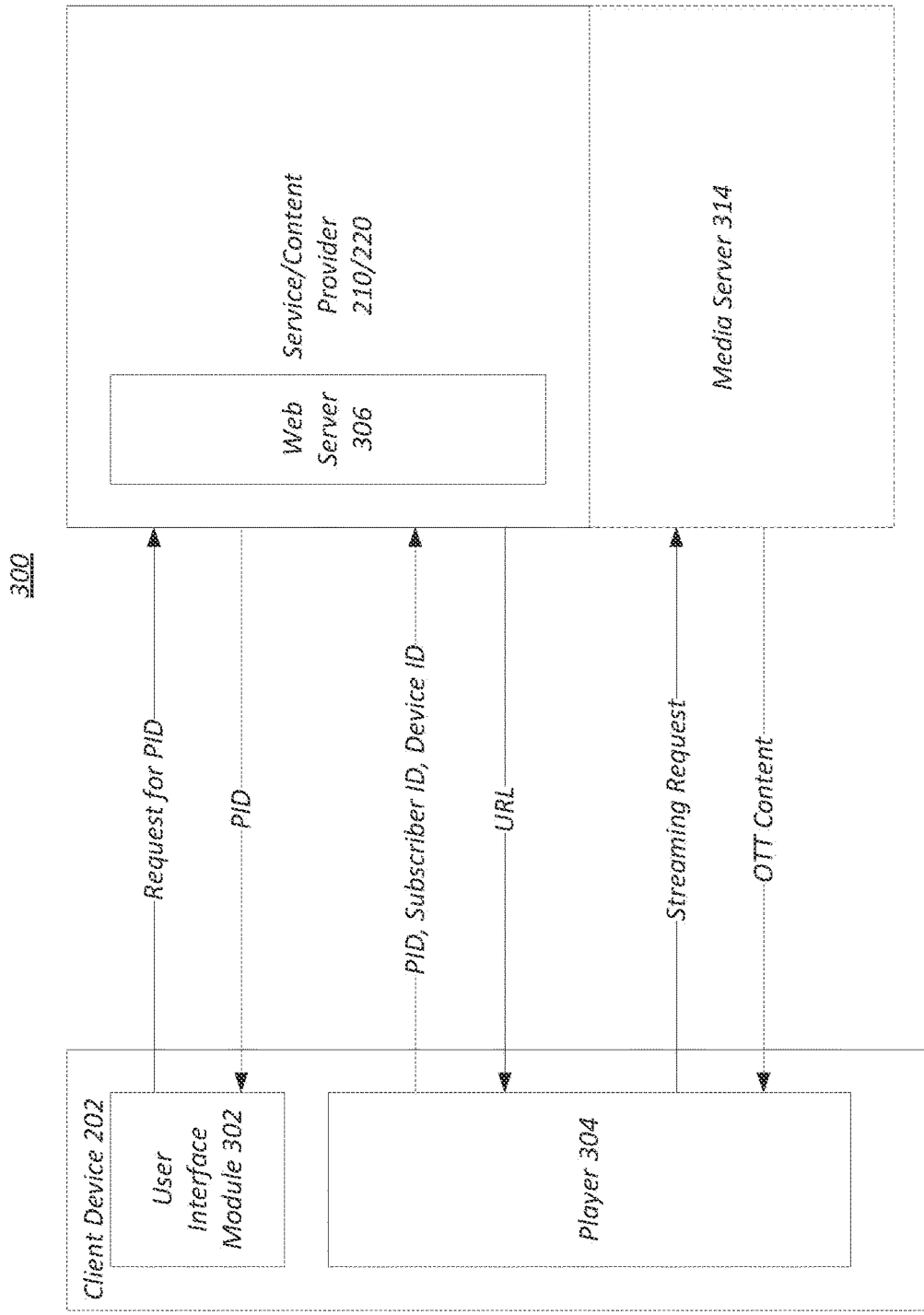
FIG. 3 is a diagram illustrating a first embodiment of a content delivery subsystem and top-level operations that can be used to offer and deliver media content for selection and presentation to the user.

FIG. 3 is a diagram illustrating a first embodiment of a content delivery subsystem (CDS) 300 and top-level operations that can be used to offer and deliver media content for selection and presentation to the user 232. In the illustrated embodiment, the CDS 300 includes the client device 202, a service provider 210, and an advertisement provider 240.

When the user 232 selects a media program using the client device 202, a media player 304 running in a client device 202 issues a session request to a web server 306 to initiate a streaming session. The web server 306 responds by transmitting a session description to the client media player 304. Using the session description, the client device 202 then sets up a session with the media server 314.

A message is transmitted from the client device 202 to the service provider 210 requesting the media program identifier (PID) of the selected media program. A feed service of the web server 306 receives the request, and determines the PID for the selected media program and transmits the PID to the client device 202. The client device 202 transmits this PID and a user ID to the service provider 210. The web server 304 transmits information including the URL from which the client device 202 may obtain the selected media program from the media server 314, as well as advertisements from the advertising provider 240. The client device 202 transmits a media program request to the media server 314 at a specified address. The media server 314 retrieves the media program from secure storage, and transmits the media program to the client device 202. The client device 202 may also request advertisements from the advertising provider 240 and receive them as well.

The client device 202 may include an interface module 302 and a media player 304. The interface module 302 includes instructions performed by the client device 202 that are used to present information and media programs to the user 232 and to accept user input, including commands.

The media player 304 receives and buffers the media program stream and plays it in an appropriately sized window on the client device(s) 202. Media players 304 generally support such functions as play and stop, as well as trick play function such as fast forward, fast reverse, and seek. The media player 304 can be stand-alone media player or may be a browser plug-in or an Active-X control.

The protocols used to stream media programs may include:

Hypertext Transfer Protocol (HTTP): An application-level protocol for distributed, collaborative, hypermedia information systems. It is a generic, stateless, object-oriented protocol that can be used for many tasks, such as name servers and distributed object management systems, through extension of its request methods. The session request will typically conform to HTTP.

Session Description Protocol (SDP): STP is a media description format used to describe multimedia sessions for the purposes of session announcement, session invitation, and other forms of multimedia session initiation.

Real Time Streaming Protocol (RSTP): RSTP is an application-level streaming protocol that is used to control the delivery of data with real-time properties such as the media program itself. RTSP provides controlled, on-demand delivery of audio and video. Typically, this is accomplished using the Transmission Control Protocol (TCP). TCP manages message acknowledgement, retransmission, and timeout, and requires handshaking to assure messages are delivered. If messages are lost during transmission, retransmission of the lost message is requested. Once a connection is set up, user data may be sent bidirectionally over the connection. TCP can be used to send commands from the client device 202 404 (such as "start" and "pause") and sending commands from the media server 314 to the media player 304 for specific information (such as the title of media programs and clips). RSTP messages may include request messages and response messages. Request messages can be sent by the client device 202 to the media server 314 server or vice versa, and include the method to be applied to the resource and the identifier of the resource. Response messages are transmitted in response to an RSTP request message. RSTP methods can include the following:

DESCRIBE: The DESCRIBE method retrieves the description of a media program identified by the request (typically identified by the URL associated with the media program). This function includes request and response pair that are used to initialize the link.

SETUP: The SETUP method specifies the transport mechanism to be used for the streamed media program. Transport parameters acceptable to the client media player 304 for data transmission are specified, and the response from the server includes the transport parameters selected by the media server 314.

OPTIONS: The OPTIONS method requests available methods.

ANNOUNCE: The ANNOUNCE method requests a description of media object

PLAY: The PLAY method starts or repositions playback of the media program. The PLAY method tells the media server 314 to start sending the media program data via the mechanism that was specified in the setup command. The PLAY request positions the normal play time to the beginning of the range specified and delivers stream data until the end of the range is reached REDIRECT: The REDIRECT method redirect client media player 304 to different media server 314.

PAUSE: The PAUSE method causes the stream delivery to be interrupted (halted) temporarily. If the request URL names a stream, only playback and recording of the named stream is halted. For example, for audio, this is equivalent to muting. If the request URL names a presentation or group of streams, delivery of all currently active streams within the presentation or group is halted. After resuming playback or recording, synchronization of the tracks is maintained. Media server 314 resources are maintained, though servers MAY close the session and free resources after being paused for the duration specified with by timeout parameter, which may be provided in the message sent with the SETUP method.

SET PARAMETER: This method permits device or encoding control.

TEARDOWN: The TEARDOWN method stops the stream delivery for the media program associated with a given uniform resource identifier (URI), freeing the resources associated with it. If the URI is the presentation URI for currently streamed media program, any RTSP session identifier associated with the session is no longer valid. Unless all transport parameters are defined by the session description, a SETUP request must be issued before the media program can be played again.

Real-time Transport Protocol (RTP): RTP is a user datagram protocol (UDP) packet format and set of conventions that provides end-to-end network transport functions suitable for applications transmitting real-time data, such as audio, video or simulation data, over multicast or unicast network services. UDP is simple, connectionless protocol in which information is transmitted in one direction from the source to the destination without verifying the readiness or state of the receiver.

Real-time Control Protocol (RTCP): RTCP is the control protocol that works in conjunction with RIP. RTCP control packets are periodically transmitted by each participant in an RTP session to all other participants. RTCP is used to control performance and for diagnostic purposes.

Media programs may be transmitted on-demand, live, or simulated. live. When transmitted on-demand, a clip of a media program is available to the user(s) 232 whenever the user(s) want it. The user(s) 232 can fast-forward, rewind, or pause the clip, and media server 314 will send the portion of the media program that is requested. Typically, on-demand media programs are prerecorded or pre-assembled.

HTTP Live Streaming (HLS): HLS is an HTTP-based adaptive bitrate streaming communications protocol implemented by APPLE Inc. as part of its QUICKTIME, SAFARI, OS X, and iOS software. Client implementations are also available in MICROSOFT EDGE, FIREFOX and some versions of GOOGLE CHROME. Support is widespread in streaming media servers.

Figure 4:
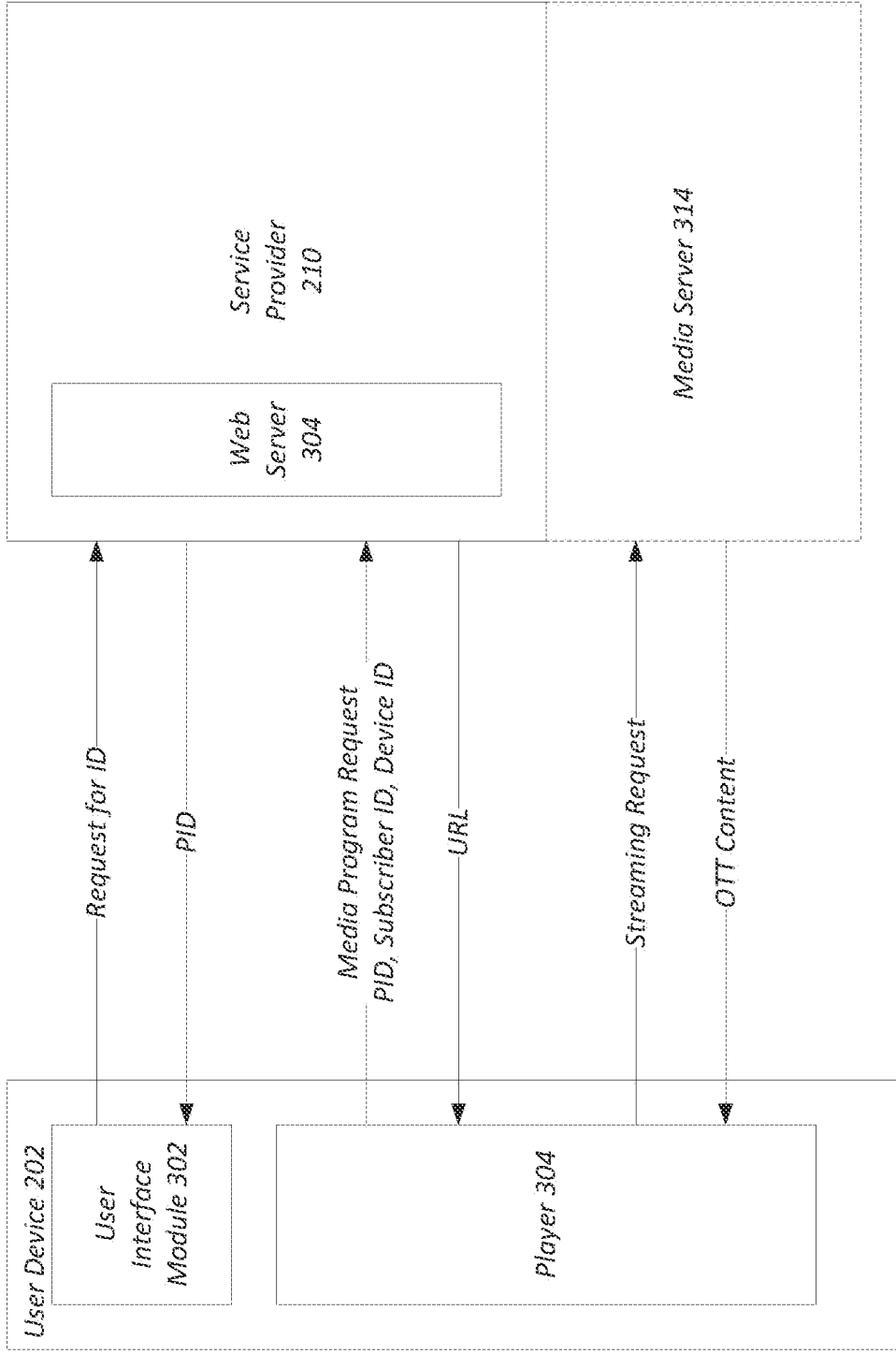
FIG. 4 is a diagram illustrating the transmission of media programs according to the HLS protocol.

FIG. 4 is a diagram illustrating the transmission of media programs according to the HLS protocol. Fundamentally, this protocol is similar to the protocol illustrated in FIG. 3, except that the when the client device 202 requests the media program, it is provided with a "playlist" of small segments or "chunks" of the media program. The client device 202 uses the playlist to request transmission of each chunk of the media program in order, and when each chunk is received, it is processed and assembled into the media program presented to the user 232.

As shown in FIG. 4, the client device 202 transmits a request for the PID of the media program to the feed service of the service provider 210. The request typically comprises a user ID, client device ID or a proxy thereof, as well as some identification for the media program of interest. The web server 306 receives the request, and obtains the PID of the requested media program, using information obtained from a content metadata/streaming information database. The PID is then transmitted to the client device 202. The client device 202 then transmits a media program request with the PID to a content selector of the web server 306.

In this embodiment, the media program is broken up into a plurality of segments or chunks that can be transmitted to the client device 202 upon request from the client device 202. Which segments to request and the order to request them is determined by a segment playlist that is transmitted from the service provider 210 to the client device 202.

The live streaming protocol includes the transmission of a segment playlist having addresses or URIs to the media program segments to the media player 304. Since the media program player 304 has the information necessary to retrieve any segment (and hence, any frame) using the addresses or URIs in the segment playlist, the user interface module 302 implementing a user interface, responds to the media program navigation commands by determining segment having the media program frames complying with the navigation request, requesting such segments (if they have not already been received and buffered), and presenting the frames from such segments as indicated above.

As described above, different OTT streaming applications display different unrelated error messages to customers when the maximum number of devices allowed to support active streaming sessions is reached. Consequently, the customer becomes confused and unaware of actual problem behind why the customer's request to stream content has been denied. To ameliorate this issue, we describe a system and method for notifying users 232 about what different active client devices 202 are OTT streaming and details about these client devices. This provides the users 232 with meaningful information (for example, indicating that the subscriber account supports max 'N' number of devices at same time and currently it is actively being used at different location and that the limit is reached).

This notifying message can include further details about the other active devices. Device details can include, for example, an associated name or friendly name or family relation name. For example: "Dad's iPad", "John-SonyXperiaZ", "KidsRoom-iPad", "iPhone-FF.66.77.AA.CC.55" or simply device MAC address—'AA.BB.CC.11.22.33'. The details can optionally be even further extended to include the location of device and the details of the OTT content currently being played. Access to some details may be provided as a customer selectable option. For example, details that involve privacy issues (e.g. the OTT content being streamed to other devices) may be provided as a customer selectable option. The scope and details of the message about the devices currently active at same time are discussed below.

Application to Different OTT Streaming Paradigms

Currently, neither DRM license servers nor the W3C EME specification support this the foregoing features. Several embodiments are presented, depending on the system parameters and protocols of the content distribution system.

Application to EME Compliant Systems: This embodiment is most applicable for use with systems in which all devices coexisting on the subscriber account are compliant with the EME W3C protocol and using a browser-based MI application. Two sub solutions are described for this application: a first sub solution in which the W3C EME specification is changed to add an additional EME call to pass the notification and any details included in the notification, and a second sub solution in which an existing EME call (for example, a "sessionUpdate" call can be extended to pass the notification message and further details (for example, the number of active client devices 202 in use compared to the maximum number).

Application to DRM License Server System Application: This embodiment is most applicable to systems using a DRM licenses server (such as GOOGLE's WIDEVINE, which is used with content from YOU TUBE, or MICROSOFT's PLAYREADY, as is used by both YOU TUBE and NETFLIX). In this case, the DRM License response format is modified as described below. As this approach is agnostic to the client-side implementation, it can be used on any client device whether 'browser based' or 'native application' based.

Non-Standard Applications: This embodiment is applicable to non-standard applications and requires proprietary plugins at the client device to monitor OTT playback start/stop events and share client device details over a common network socket bridged among all connected devices via common cloud server hosted by service provider. With this approach, new features such as a priority-based approach can be implemented. In one embodiment, this priority-based approach, existing ongoing playback by a low priority user is stopped or paused and streaming commenced to a new higher priority user. In another embodiment, this is implemented by a mutual request and relinquish paradigm, wherein the higher priority user requests that the lower priority user relinquish their streaming session so that the higher priority user can begin the new streaming session.

In block 502, a request is received to receive and play media content from a requesting client device 202. The request may be received by a web server 306 of a service provider 210 or content provider 220 by any of the foregoing protocols. The client device 202 is one of a plurality of client devices, each enabled to receive OTT media content according to a subscriber In block 504, a determination is made as to whether the subscriber account is undersubscribed. As used herein, the subscriber account state of being "undersubscribed" refers to a state in which a subscriber account permitting only N client devices 202 to receive and play media content at a time, has M=N client devices 202 currently active in a streaming session. In other words, all of the available number of concurrent streaming devices of the subscriber account are being utilized, and no further devices 202 are currently permitted to stream media content. This can be accomplished, for example, by determining a number M of client devices 202 active in a streaming session and comparing the number M to the number N. If the number M of client devices 202 currently streaming media content equals or exceeds N, the subscriber account is determined to be undersubscribed.

In one embodiment, the determination that M=N client devices 202 are active in a streaming session is determined by the service/content provider 210/220 by determining which other client devices 202 on the subscriber account are logged in. In other embodiments, the this may be determined by use of information from the media server 314, which uses streaming requests. Since OTT streaming permits "trick play" features in which a user may pause, rewind, or fast forward through media content, it is possible for a client device 202 to be active in a streaming session, without receiving and playing media content at every moment. This may occur, for example, if the user of a client device 202 pauses play for an extended period of time. In such case, the service/client provider 210/220 may determine that the streaming session has ended, and the subscription slot occupied by that client device 202 may be used by another. In such case, the service/content provider 210/220 may transmit a message to the client device 202 indicating that another of the client devices 202 of the subscription account would like to stream media content and asking for approval to end the currently active streaming session, or may simply log off the client device 202 that has excessively paused the streaming of OTT content. Different usage models can be used to predict when a client device 202 is no longer actively streaming media content.

In block 506, processing is routed to block 508 if the subscriber account is not undersubscribed (e.g. the number of client devices 202 currently streaming media programs under the user subscription is an integer less than N. Processing is routed to block 508, which begins streaming of the media content as described above. Conversely, processing is routed to block 510 if the subscriber account is undersubscribed. Block 510 transmits information to the requesting client device 202 identifying current other subscriber account activity causing the undersubscription of the subscriber account without initiating transmission of the media content. In a simple embodiment, this information includes information that indicates a denial of service and the reason for the denial of service (e.g. the subscription does not permit any more devices to concurrently stream data). In another embodiment, the information includes facts regarding the subscription as well. For example, the information may indicate that the user subscription permits three devices to stream at the same time, and there are currently three client devices 202 streaming media content. The information may further identify the client devices 202 or the users logged into such client devices 202. An option may also be presented to permit the user to update their subscriber account (for example, for additional fees) to permit an additional device to concurrently stream media content, or to provide a fee for a one time viewing of the media content. In other embodiments, the information may include a time the current other subscriber account activity commenced (e.g. when the other client devices 202 logged in or began streaming content), the media content implicated by the current other subscriber account activity (e.g. information identifying the media content that the other client devices 202 of the subscriber account are streaming).

The information may also comprise the location of the client device(s) 202 performing the current other user activity, and a time at which the media content streaming by the other client devices 202 currently streaming media programs is expected to be completed. In one embodiment, a single time is given representing the earliest time (or time until) any of the client devices 202 is expected to complete streaming the media content. In other embodiments, a time (or time until) each one of the media devices will have completed streaming the media content they are currently streaming is presented.

In one embodiment, such times are according to upon trick play commands from the users of those devices 202. For example, suppose a client device 202A is attempting to stream media content in an oversubscribed state in which only two client devices 202 are permitted stream media content concurrently. In this case, the information provided may indicate that client device 202B is currently streaming media content and is predicted to complete the streaming in 15 minutes, that client device 202C is currently streaming media content and is expected to complete the streaming in 43 minutes. However, if the user 232 of client device 202B were to use trick play controls to rewind the media content being streamed by client device 202B by 30 minutes, the information transmitted to client device 202A would reflect this change. Further, since client device 202C is now expected to complete streaming its media content before client device 202A, client device 202C may be highlighted (e.g. by listing client device 202C first).

In a further embodiment, client device 202A can be used to disable at least a subset of the trick play operations of the other client devices 202B-202D, for example, to prevent the streaming from being "rewound" or rewound more than a number of minutes. This presumes a level of privilege of client device 202A to be above that of the other client devices 202B-202D (for example, if a parent is using client device 202A and children are using client devices 202B-202D), however, other embodiments may only permit such control if the client devices 202B-202D being controlled assent.

In still further embodiments, the information includes any one or combination of a uniform resource locator (URL) or media access control (MAC) address of the client device(s) 202 used for the other subscriber account activity (e.g. currently streaming media content), or simply an identifier of such client device(s), 202 such as a friendly name (e.g. Dad's iPad). Such information can be obtained from the device name stored in the operating system of the client device 202, or entered in response a request for information to set up the smart notification functionality.

To account for privacy concerns, the provision of any of the above information or any combination of the above information may be predicted on permission granted by the users 232 of the client devices 202 currently streaming media content or those of the subscriber account. Such permission can be provided in advance (e.g. as a part of enabling the client device 202 to use the subscriber account), or when the client device 202 is denied service.

In one embodiment, the request to receive and play the media content is received in a browser executed by the requesting client device 202 via a communication channel established by a browser application program interface (API) between the requesting client and a digital rights management system of the service provider 210 or content provider 220. In such embodiments, the information is received by the client device 202 via the API. The API may be compliant with a baseline or extended encrypted media extensions (EME) protocol (discussed at https://www.w3.org/TR/encrypted-media/, which is hereby incorporated by reference). The EME protocol is a specification providing a communication channel between web browsers and DRM systems that permits DRM-encoded content such as streaming content to be played back without heavier browser plugins such as ADOBE FLASH and MICROSOFT SILVERLIGHT. The EME protocol extension may include, for example, a further information, message call, or method to transmit the information to the client device 202. Alternatively, the EME protocol extension may include a baseline method that has been extended to transmit the information, such as an extended sessionUpdate call that appends custom data to the response.

For example, Section 6.0 of the EME specification describes an "update" method with the following syntax:
Promise<void> update(BufferSource response)
The update method provides messages, including licenses, to the CDM. In the EME protocol, this method is defined as follows:

| Parameter | Type | Nullable | Optional | Description |
|---|---|---|---|---|
| Response | BufferSource | x | x | A message to be provided to the CDM. The contents are Key System-specific. It must not contain executable code |

The update method also is characterized by a return type of "Promise<void>. In this case, custom data may be comprised of details about all current active client devices in use, including the being a device identifier (e.g. MAC address) or friendly name, location of device, details regarding the OTT content being played by the other devices associated with the subscription, the start time and expected end time of the OTT content being streamed to the other devices and the relative priority of the other devices. For example, in one embodiment, the client devices 202 associated with a subscription may be assigned a priority, with streaming to a client device 202 having a lower priority being discontinued when a client device 202 having a higher priority requests streaming of a media program in the undersubscribed state. In this situation, the lower priority client device 202 may be informed as to why streaming was discontinued with analogous information.

This custom data may be provided by the update method by polymorphing the update method as:
Promise<void> update(BufferSource response, BufferSource customData)

This polymorphism of the update method to allow custom data allows the data to be transmitted to devices that can retrieve and use the information, but allows older devices unable to retrieve and use the information to simply ignore the custom data.

In another embodiment, the custom data may be provided by extending section 6.5 of the EME specification ('Exceptions') to add the error condition "UserAccountUndersubscription," and the possible cause being "maximum number of devices are currently streaming media."

DRM License Server System Application

In another embodiment, the request to receive and play the media content is received in a browser executed by the requesting client device 202 via a communication channel established by a browser application program interface (API) between the requesting client and a digital rights management system of the service provider 210 or content provider 220. In such embodiments, the information is received by the client device 202 via the API.

DRM license request and responses are typically formatted in extended markup language (XML) (for example, MICROSOFT's PLAYREADY) or JAVASCRIPT object notation (JSON) format (for example, WIDEVINE). The format of Microsoft's PlayReady DRM license request and response is illustrated at https://docs.microsoft.com/en-us/playready/overview/license-server, which is hereby incorporated by reference. In this paradigm, (1) the client obtains media to be played back; (2) the client initiates a license request from the PlayReady license service (the client can either proactively request the license before playing back the content, or reactively request the license once it discovers a license is required after playback begins); (3) the PlayReady License Server receives the request from the client and processes the license request; (4) the PlayReady License Server sends the response to the request back to the client. The license response will contain the key to unlock the encrypted media, along with a set of rights and rights restrictions that specify exactly what can be played back. Finally, (5) the client receives the license response, parses the rights and rights restrictions, and begins playback.

In this embodiment, this paradigm is extended to include details about all current active devices in use by grouping details under custom tag. Microsoft PlayReady already includes a 'CustomData' tag. In embodiments wherein the DRM system does not include a "custom data" tag or analogous means for providing the information, the notion of a custom tag or other artifice needs to be introduced into the DRM system.

FIG. 6 is a diagram of an example of custom data in an XML format. Note that the custom data identifies active client devices and the details regarding each such device. In the illustrated embodiment, two devices are active and are listed in the custom data. The device details include a device identifier (DeviceID), which includes a MAC address and friendly name, a device location (DeviceLocation), and the name of the content currently being streamed to the device (OTT_ContentName). In the illustrated embodiment, Jurassic Park 3 is being streamed to John-iPad. The device details also include the duration (Duration), including the start time and the expected end time, and the priority of the device (priority). Similar information is presented for the second device (KidsRoom-iPad).

Custom data can be in JSON format (e.g. in case of WIDEVINE) or different format as supported by type of DRM. For devices that do not support this feature, custom data may be ignored.

Non-Standard Applications

Figure 5:
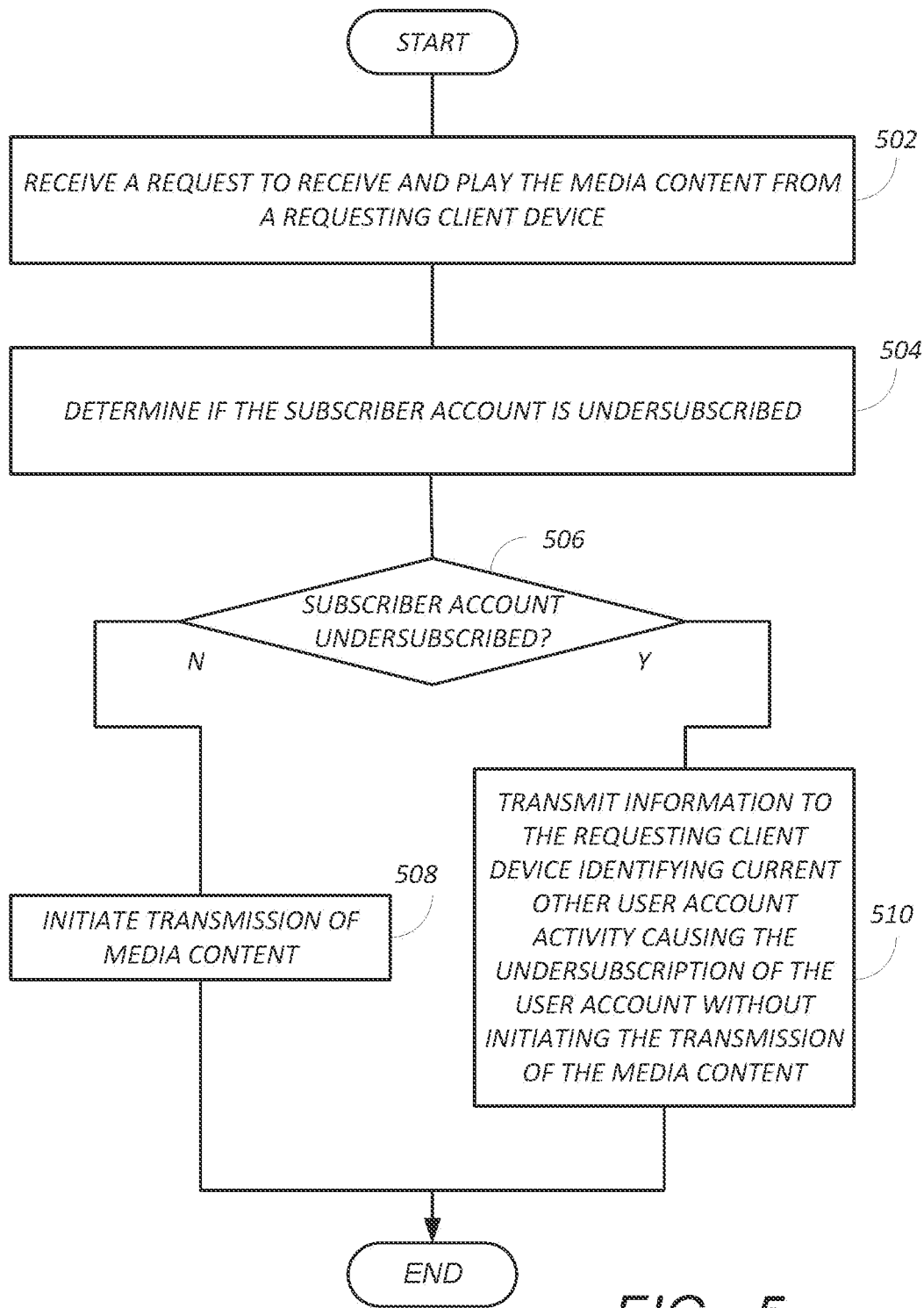
FIG. 5 is a diagram illustrating exemplary operations that can be performed to provide smart notification to client devices requesting media content.

In still another embodiment, the client device 202 executes a native application or plug in that monitors subscriber account activity by the client device 202, and reports such subscriber account activity by the respective client device 202 (and any other metadata required to generate the information to be transmitted to other client devices 202 of the subscriber account) to an entity such as the service/content provider 210/220. The entity receiving the reports complies a database of those client devices 202 currently having active streaming activity and relates this list to the metadata describing the activity. This compiled database is used to determine if the subscriber account is undersubscribed, as shown in block 506 of FIG. 5. Further, in embodiments in which enriched information is transmitted to client devices 202 requesting initiation of a streaming session (e.g. the operations of block 510 in FIG. 5 where the information includes data identifying other subscriber account activity or providing further information about that activity), such enriched information can be obtained from such database.

Hardware Environment

Figure 7:
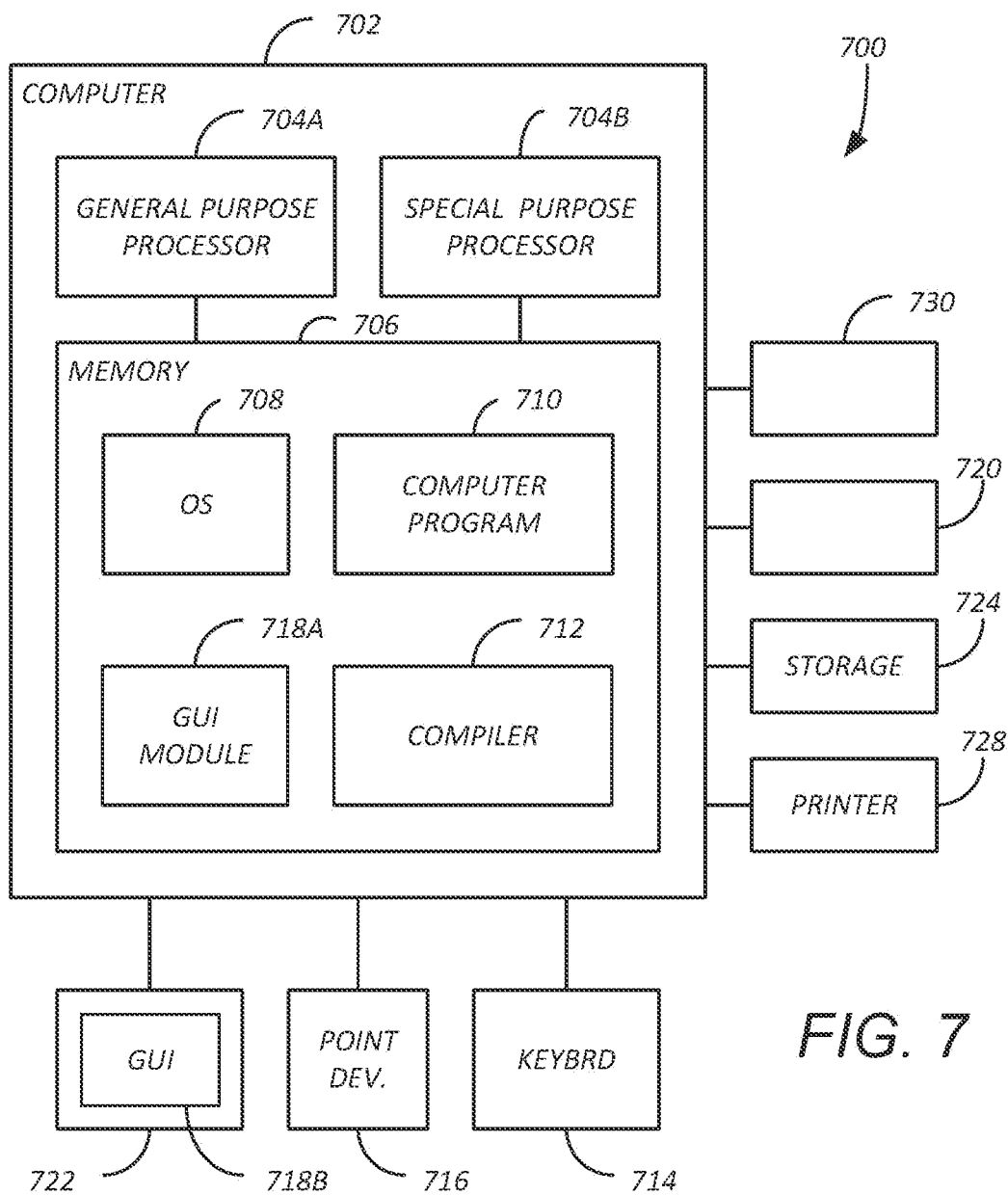
FIG. 7 illustrates an exemplary computer system that could be used to implement processing elements of the geolocation system.

FIG. 7 illustrates an exemplary system 700 that could be used to implement processing elements of the above disclosure, including the client device(s) 202, web server 306, and media server 314. A computer 702 comprises a processor 704 and a memory, such as random access memory (RAM) 706. The computer 702 is operatively coupled to a display 722, which presents images such as windows to the user on a graphical user interface 718B. The computer 702 may be coupled to other devices, such as a keyboard 714, a mouse device 716, a printer 728, etc. Of course, those skilled in the art will recognize that any combination of the above components, or any number of different components, peripherals, and other devices, may be used with the computer 702.

Generally, the computer 702 operates under control of an operating system 708 stored in the memory 706, and interfaces with the user to accept inputs and commands and to present results through a graphical user interface (GUI) module 718A. Although the GUI module 718B is depicted as a separate module, the instructions performing the GUI functions can be resident or distributed in the operating system 708, the computer program 710, or implemented with special purpose memory and processors. The computer 702 also implements a compiler 712 which allows an application program 710 written in a programming language such as COBOL, C++, FORTRAN, or other language to be translated into processor 704 readable code. After completion, the application 710 accesses and manipulates data stored in the memory 706 of the computer 702 using the relationships and logic that was generated using the compiler 712. The computer 702 also optionally comprises an external communication device such as a modem, satellite link, Ethernet card, or other device for communicating with other computers.

In one embodiment, instructions implementing the operating system 708, the computer program 710, and the compiler 712 are tangibly embodied in a computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of instructions which, when read and executed by the computer 702, causes the computer 702 to perform the operations herein described. Computer program 710 and/or operating instructions may also be tangibly embodied in memory 706 and/or data communications devices 730, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

To the extent that terms "includes," "including," "has," "contains," and variants thereof are used herein, such terms are intended to be inclusive in a manner similar to the term "comprises" as an open transition word without precluding any additional or other elements. The term ""exemplary" is used herein to mean serving as an example, instance, or illustration and is not necessarily to be construed as preferred or advantageous.

The foregoing discloses an apparatus, method and system for providing a subscriber account undersubscription messages. One embodiment is evidenced by a receiving a request to receive and play the media content from a requesting client device, the requesting client device being one of a plurality of client devices enabled to receive media content according to a subscriber account; determining if the subscriber account is undersubscribed; if the subscriber account is not undersubscribed, initiating transmission of the media content; and if the subscriber account is undersubscribed, transmitting information to the requesting client device, the information including data indicating the subscriber account is undersubscribed without initiating the transmission of the media content.

Implementations may include one or more of the following features:

Any of the methods described above, wherein the information includes: data identifying current other subscriber account activity causing the undersubscription of the subscriber account without initiating the transmission of the media content.

Any of the methods described above. wherein the information includes supplemental information including one or more of: a time the current other subscriber account activity commenced; the media content streamed by the other subscriber account activity; a location of client device performing the current other subscriber account activity; and a time at which streaming of the media content implicated by the current other subscriber account activity is predicted to end.

Any of the methods described above, wherein the supplemental information is provided only upon approval the client associated with the current other subscriber account activity.

Any of the methods described above, wherein the information includes at least one of: a uniform resource locator (URL) of other of the plurality of client devices used for the other subscriber account activity; a media access control (mac) address of other of the plurality of client devices used for the other subscriber account activity; and an identifier of the other of the plurality of client devices used for other subscriber account activity, selected from the group including: a friendly name of the other of the plurality of client devices.

Any of the methods described above, wherein the subscriber account is limited to maximum number n client devices concurrently active in a streaming session and determining that the subscriber account is undersubscribed includes: determining a number m of client devices currently active in a streaming session; and determining that the number of client devices currently active in a streaming session m equals or exceeds n.

Any of the methods described above, wherein: the request to receive and play the media content is received via browser executed by the requesting client and via a communication channel established by an browser application program interface (API) between the requesting client device and a digital rights management system; and the information is received by the client device via the API.

Any of the methods described above, wherein the API is compliant with an encrypted media extension (EME) protocol.

Any of the methods described above, wherein the EME protocol is extended to include an information message/call for transmitting the information.

Any of the methods described above, wherein the EME protocol includes an existing method extended to transmit the information.

Any of the methods described above, wherein the extended method is an extended sessionupdate call appending custom data including the information to a response.

Any of the methods described above, wherein the extended sessionupdate call is polymorphed to add a separate type for the custom data.

Any of the methods described above, wherein: the content distribution system includes a content server and a license server, and wherein: the request to receive and play the media content includes a request for a license to play the media content; and the information is transmitted in a response to the request for the license.

Any of the methods described above, wherein: the client device implements a browser; the request to receive and play the media content is received via the browser; and the information is transmitted to the client device via the browser.

Any of the methods described above, wherein: the client device executes a native application provided by a source of the media content; the request to receive and play the media content is received via the native application; and the information is transmitted to the client device via the native application.

Any of the methods described above, wherein: each of the plurality of client devices executes a plug-in that monitors subscriber account activity by the respective client device and reports the subscriber account activity by the respective client device; and determining if the subscriber account is undersubscribed is performed using the reported subscriber account activity by each of the respective client devices.

Another embodiment is evidenced by a web server, the web server having: a processor; a memory, communicatively coupled to the processor, the memory storing processor instructions including processor instructions for: receiving a request to receive and play the media content from a requesting client device, the requesting client device being one of a plurality of client devices enabled to receive media content according to a subscriber account; determining if the subscriber account is undersubscribed; initiating transmission of the media content if the subscriber account is not undersubscribed; and transmitting information to the requesting client device, the information including data indicating the subscriber account is undersubscribed without initiating the transmission of the media content if the subscriber account is undersubscribed.

Implementations may include one or more of the following features:

Any of the apparatuses described above, wherein the information includes: data identifying current other subscriber account activity causing the undersubscription of the subscriber account without initiating the transmission of the media content.

Any of the apparatuses described above, wherein the information includes supplemental information including one or more of: a time the current other subscriber account activity commenced; the media content streamed by the other subscriber account activity; a location of client device performing the current other subscriber account activity; and a time at which streaming of the media content implicated by the current other subscriber account activity is predicted to end.

Any of the apparatuses described above, wherein the supplemental information is provided only upon approval the client associated with the current other subscriber account activity.

Any of the apparatuses described above, may also include smart notification for over-the-top (OTT). The apparatus may also include streaming among multiple devices.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. In a system providing media content via an over-the-top content distribution system, a method of providing a subscriber account undersubscription message, comprising:
receiving a request to receive and play the media content from a requesting client device, the requesting client device being one of a plurality of client devices enabled to receive media content according to a subscriber account;
determining that the subscriber account is undersubscribed;

responsive to determining that the subscriber account is undersubscribed: (i) transmitting information to the requesting client device, the information including data indicating the subscriber account is undersubscribed; and (ii) without initiating the transmission of the media content to the requesting client device, restricting a current usage of the subscriber account by a client device other than the requesting client device.

2. The method of claim 1, wherein the information includes:
data identifying current other subscriber account activity causing the undersubscription of the subscriber account without initiating the transmission of the media content.

3. The method of claim 2, wherein the information includes supplemental information comprising one or more of:
a time the current other subscriber account activity commenced;
the media content streamed by the other subscriber account activity;
a location of client device performing the current other subscriber account activity; and
a time at which streaming of the media content implicated by the current other subscriber account activity is predicted to end.

4. The method of claim 3, wherein the supplemental information is provided only upon approval by the client associated with the current other subscriber account activity.

5. The method of claim 1, wherein the subscriber account is limited to maximum number N client devices concurrently active in a streaming session and determining that the subscriber account is undersubscribed comprises:
determining a number M of client devices currently active in a streaming session; and
determining that the number of client devices currently active in a streaming session M equals or exceeds N.

6. The method of claim 1, wherein:
the request to receive and play the media content is received via browser executed by the requesting client and via a communication channel established by an browser application program interface (API) between the requesting client device and a digital rights management system; and
the information is received by the client device via the API.

7. The method of claim 6, wherein the API is compliant with an encrypted media extension (EME) protocol.

8. The method of claim 7, wherein the EME protocol is extended to include an information message/call for transmitting the information.

9. The method of claim 7, wherein the EME protocol comprises an existing method extended to transmit the information.

10. The method of claim 9, wherein the extended method is an extended sessionUpdate call appending custom data comprising the information to a response.

11. The method of claim 10, wherein the extended sessionUpdate call is polymorphed to add a separate type for the custom data.

12. The method of claim 1, wherein:
the content distribution system comprises a content server and a license server, and wherein:
the request to receive and play the media content includes a request for a license to play the media content; and
the information is transmitted in a response to the request for the license.

13. The method of claim 12, wherein:
the client device implements a browser;
the request to receive and play the media content is received via the browser; and
the information is transmitted to the client device via the browser.

14. The method of claim 1, wherein:
the client device executes a native application provided by a source of the media content;
the request to receive and play the media content is received via the native application; and
the information is transmitted to the client device via the native application.

15. The method of claim 1, wherein:
each of the plurality of client devices executes a plug-in that monitors subscriber account activity by the respective client device and reports the subscriber account activity by the respective client device; and
determining if the subscriber account is undersubscribed is performed using the reported subscriber account activity by each of the respective client devices.

16. In a system providing media content via an over-the-top content distribution system, an apparatus for providing a subscriber account undersubscription message, comprising:
a web server, the web server having:
a processor;
a memory, communicatively coupled to the processor, the memory storing processor instructions including processor instructions for:
receiving a request to receive and play the media content from a requesting client device, the requesting client device being one of a plurality of client devices enabled to receive media content according to a subscriber account;
determining that the subscriber account is undersubscribed;
responsive to determining that the subscriber account is undersubscribed: (i) transmitting information to the requesting client device, the information including data indicating the subscriber account is undersubscribed; and (ii) without initiating the transmission of the media content to the requesting client device, restricting a current usage of the subscriber account by a client device other than the requesting client device.

17. The apparatus of claim 16, wherein the information includes:
data identifying current other subscriber account activity causing the undersubscription of the subscriber account without initiating the transmission of the media content.

18. The apparatus of claim 17, wherein the information includes supplemental information comprising one or more of:
a time the current other subscriber account activity commenced;
the media content streamed by the other subscriber account activity;
a location of client device performing the current other subscriber account activity; and
a time at which streaming of the media content implicated by the current other subscriber account activity is predicted to end.

19. The apparatus of claim 18, wherein the supplemental information is provided only upon approval by the client associated with the current other subscriber account activity.

\* \* \* \* \*